US012614360B2

(12) United States Patent
Aoki

(10) Patent No.: US 12,614,360 B2
(45) Date of Patent: Apr. 28, 2026

(54) HEAD MOUNTED DISPLAY, CONTROL METHOD OF HEAD MOUNTED DISPLAY, AND NON-TRANSITORY COMPUTER READABLE MEDIUM

(71) Applicant: CANON KABUSHIKI KAISHA, Tokyo (JP)

(72) Inventor: Hikaru Aoki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 128 days.

(21) Appl. No.: 18/595,125

(22) Filed: Mar. 4, 2024

(65) Prior Publication Data

US 2024/0212296 A1    Jun. 27, 2024

Related U.S. Application Data

(63) Continuation of application No. PCT/JP2022/025136, filed on Jun. 23, 2022.

(30) Foreign Application Priority Data

Sep. 15, 2021    (JP) ................................. 2021-149905

(51) Int. Cl.
| | |
|---|---|
| *G06T 19/00* | (2011.01) |
| *G06F 3/01* | (2006.01) |
| *G06T 3/4038* | (2024.01) |
| *G06T 5/70* | (2024.01) |

(52) U.S. Cl.
CPC ............ *G06T 19/006* (2013.01); *G06F 3/013* (2013.01); *G06T 3/4038* (2013.01); *G06T 5/70* (2024.01)

(58) Field of Classification Search
None
See application file for complete search history.

(56) References Cited

U.S. PATENT DOCUMENTS

| | | | | |
|---|---|---|---|---|
| 2013/0328928 A1* | 12/2013 | Yamagishi | .............. | A63F 13/25 |
| | | | | 345/633 |
| 2020/0250498 A1* | 8/2020 | Kazi | ......................... | G06T 1/00 |
| 2021/0233312 A1* | 7/2021 | Noris | ................... | H04N 13/279 |
| 2023/0274517 A1* | 8/2023 | Navab | ..................... | G06F 3/011 |
| | | | | 345/418 |

FOREIGN PATENT DOCUMENTS

| | | | |
|---|---|---|---|
| JP | 2003296236 A | 10/2003 |
| JP | 2005049939 A | 2/2005 |
| JP | 2005202485 A | 7/2005 |

(Continued)

*Primary Examiner* — Yi Wang
(74) *Attorney, Agent, or Firm* — Canon U.S.A., Inc. IP Division

(57) ABSTRACT

A head mounted display according to the present invention includes: an image sensor configured to capture an image of a real space; a display configured to display the image of the real space captured by the image sensor so as to be visually recognized by a user; and at least one memory and at least one processor which function as: an acquiring unit configured to acquire user information on a state of the user; and a control unit configured to control display on the display so as to reduce saliency of a first object, which is a real object to which a line-of-sight of the user is directed, or of a real object other than the first object, on a basis of the user information.

18 Claims, 5 Drawing Sheets

(56)         References Cited

FOREIGN PATENT DOCUMENTS

| | | | |
|----|------------|----|---------|
| JP | 2012054897 | A  | 3/2012  |
| JP | 2014016688 | A  | 1/2014  |
| JP | 5580855    | B2 | 8/2014  |
| JP | 2014212473 | A  | 11/2014 |
| JP | 2017098879 | A  | 6/2017  |
| JP | 2017212693 | A  | 11/2017 |
| JP | 2019047234 | A  | 3/2019  |
| JP | 2019125190 | A  | 7/2019  |

* cited by examiner

*FIG. 2*

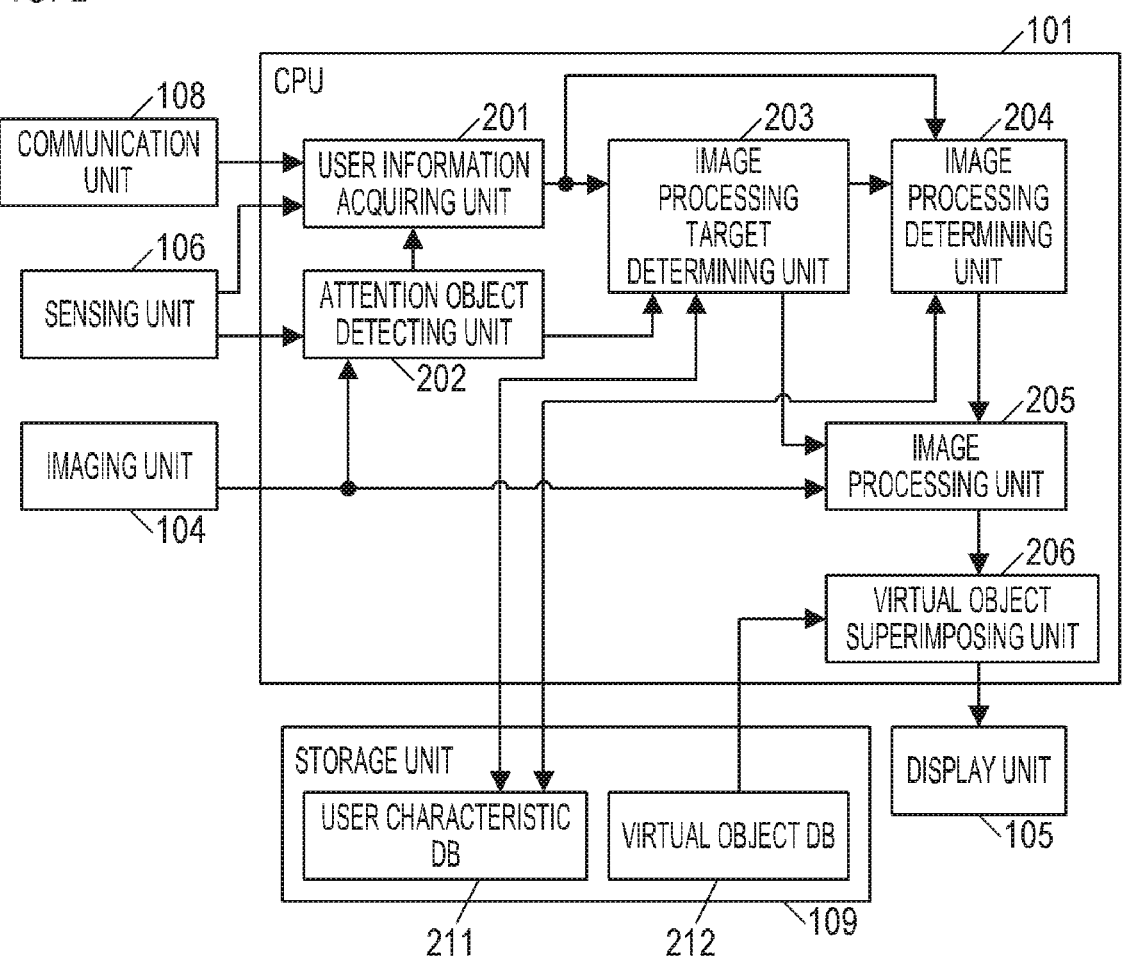

*FIG. 3*

| EMOTION LEVEL | 1 | 2 | 3 |
|---|---|---|---|
| IMAGE PROCESSING | PROCESSING TO SUPERIMPOSE VIRTUAL OBJECT | PROCESSING TO SUPERIMPOSE VIRTUAL OBJECT + PROCESSING TO CHANGE TEXTURE | PROCESSING TO BLUR IMAGE PROCESSING TARGET |
| EMOTION LEVEL | 4 | 5 | 6 |
| IMAGE PROCESSING | PROCESSING TO SUPERIMPOSE WARNING DIALOG | PROCESSING TO ERASE IMAGE PROCESSING TARGET + PROCESSING TO SUPERIMPOSE OUTLINE OF IMAGE PROCESSING TARGET | PROCESSING TO ERASE IMAGE PROCESSING TARGET |

*FIG. 6*

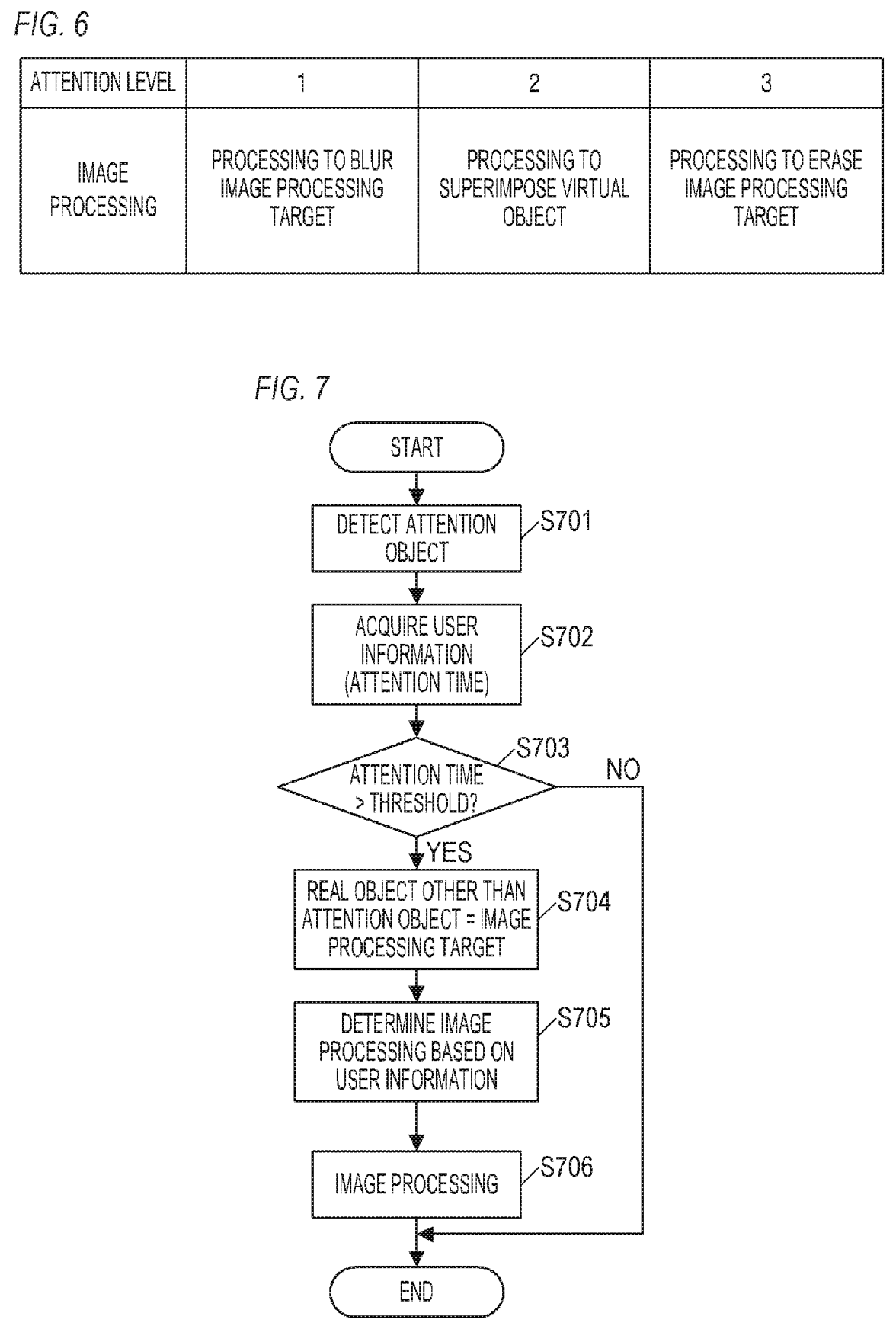

| ATTENTION LEVEL | 1 | 2 | 3 |
|---|---|---|---|
| IMAGE PROCESSING | PROCESSING TO BLUR IMAGE PROCESSING TARGET | PROCESSING TO SUPERIMPOSE VIRTUAL OBJECT | PROCESSING TO ERASE IMAGE PROCESSING TARGET |

*FIG. 7*

```
           ( START )
               │
               ▼
    ┌──────────────────┐
    │  DETECT ATTENTION │── S701
    │     OBJECT        │
    └──────────────────┘
               │
               ▼
    ┌──────────────────┐
    │  ACQUIRE USER     │── S702
    │  INFORMATION      │
    │ (ATTENTION TIME)  │
    └──────────────────┘
               │
               ▼          S703
         ◇───────────◇              NO
         ATTENTION TIME  ────────────┐
         > THRESHOLD?                │
         ◇───────────◇              │
               │ YES                 │
               ▼                     │
    ┌──────────────────┐            │
    │ REAL OBJECT OTHER │── S704     │
    │ THAN ATTENTION    │            │
    │ OBJECT = IMAGE    │            │
    │ PROCESSING TARGET │            │
    └──────────────────┘            │
               │                     │
               ▼                     │
    ┌──────────────────┐            │
    │ DETERMINE IMAGE   │── S705     │
    │ PROCESSING BASED  │            │
    │ ON USER INFORMATION│           │
    └──────────────────┘            │
               │                     │
               ▼                     │
    ┌──────────────────┐            │
    │ IMAGE PROCESSING  │── S706     │
    └──────────────────┘            │
               │◄────────────────────┘
               ▼
           ( END )
```

HEAD MOUNTED DISPLAY, CONTROL METHOD OF HEAD MOUNTED DISPLAY, AND NON-TRANSITORY COMPUTER READABLE MEDIUM

CROSS-REFERENCE TO RELATED APPLICATIONS

This application is a Continuation of International Patent Application No. PCT/JP2022/025136, filed Jun. 23, 2022, which claims the benefit of Japanese Patent Application No. 2021-149905, filed Sep. 15, 2021, which is hereby incorporated by reference herein in its entirety.

BACKGROUND OF THE INVENTION

Field of the Invention

The present invention relates to a head mounted display capable of visually recognizing a real space through a display surface.

Background Art

Cross reality (XR) is known as a technique to integrate a real space and a virtual space. Hereafter, an object that exists in a real space is called a "real object", and an object that does not exist in a real space, such as a CG model, is called a "virtual object". In XR, various image processing, such as processing of virtual object superimposition, is performed on a real space or a real object. For example, PTL 1 discloses a technique to replace a physical obstacle (real object which a user may physically contact) with a virtual object. PTL 2 discloses a technique to erase an unnecessary real object specified by a user from an image of a real space (to replace an unnecessary real object with a similar real object) using a diminished reality (DR) technique.

In the case of the technique disclosed in PTL 1, however, the user can avoid physical contact with an obstacle, but cannot avoid visual recognition of a mental obstacle (e.g. a real object which causes a negative emotion to the user) when the obstacle is within a field-of-view. Further, in the case of the technique disclosed in PTL 2, when a mental obstacle enters a field-of-view, the user has to specify this object as an unnecessary object, and cannot quickly avoid visual recognition of this object.

It is an object of the present invention to provide a technique to allow the user to quickly avoid visual recognition of a real object, which is a mental obstacle.

CITATION LIST

Patent Literature

PTL 1 Japanese Patent Laid-Open No. 5580855
PTL 2 Japanese Patent Laid-Open No. 2017-212693

SUMMARY OF THE INVENTION

The present invention in its first aspect provides a head mounted display including: an image sensor configured to capture an image of a real space; a display configured to display the image of the real space captured by the image sensor so as to be visually recognized by a user; and at least one memory and at least one processor which function as: an acquiring unit configured to acquire user information on a state of the user; and a control unit configured to control display on the display so as to reduce saliency of a first object, which is a real object to which a line-of-sight of the user is directed, or of a real object other than the first object, on a basis of the user information.

The present invention in its second aspect provides a control method of a head mounted display capable of visually recognizing a real space through a display surface, the control method including: acquiring user information on a state of a user; and controlling display on the head mounted display so as to reduce saliency of a real object to which a line-of-sight of the user is directed, or of a real object other than the real object to which the line-of-sight of the user is directed, on a basis of the user information.

The present invention in its third aspect provides a non-transitory computer readable medium that stores a program, wherein the program causes a computer to execute a control method of a head mounted display capable of visually recognizing a real space through a display surface, the control method including: acquiring user information on a state of a user; and controlling display on the head mounted display so as to reduce saliency of a real object to which a line-of-sight of the user is directed, or of a real object other than the real object to which the line-of-sight of the user is directed, on a basis of the user information.

Further features of the present invention will become apparent from the following description of exemplary embodiments with reference to the attached drawings.

BRIEF DESCRIPTION OF THE DRAWINGS

FIG. 2 is a block diagram depicting an example of a functional configuration of the display device according to Embodiment 1;

FIG. 3 is a table indicating an example of a correspondence between an emotion level and image processing according to Embodiment 1;

FIG. 6 is a table indicating a correspondence between an attention level and image processing according to Embodiment 3; and FIG. 7 is a flow chart depicting an example of an operation of a display device according to Embodiment 3.

DESCRIPTION OF THE EMBODIMENTS

Embodiment 1

Figure 1:
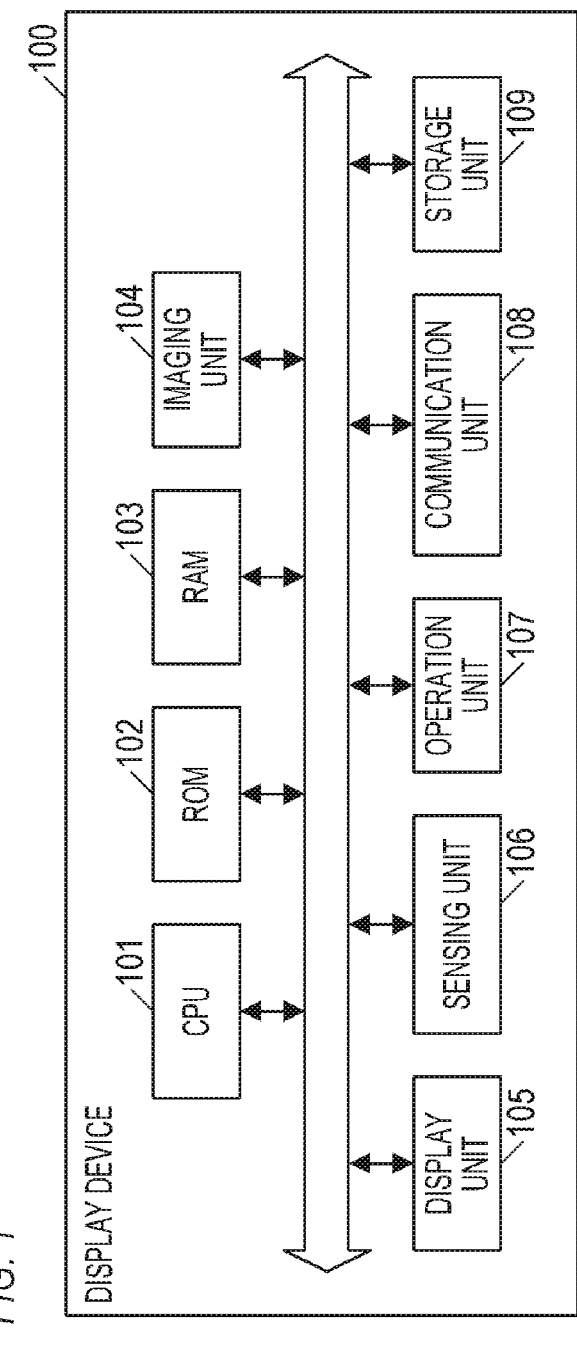
FIG. 1 is a block diagram depicting an example of a hardware configuration of a display device according to Embodiment 1.

Embodiment 1 of the present invention will now be described. FIG. 1 is a block diagram depicting an example of a hardware configuration of a display device 100 according to Embodiment 1. The display device 100 is a display device that can be used for cross reality (XR), and, for example, is a head mounted display, smart glasses, a smartphone, a tablet terminal, or the like. The display device 100 includes a CPU 101, a ROM 102, a RAM 103, an imaging unit 104, a display unit 105, a sensing unit 106, an operation unit 107, a communication unit 108, and a storage unit 109, and these components are interconnected via a bus 110.

The CPU 101 is an arithmetic processing unit that comprehensively controls the display device 100, and performs various processing by executing various programs recorded (stored) in the ROM 102, or the like. The ROM 102 is a non-volatile read-only memory that records (stores) various programs and various parameters which do not required an update, such as an image processing program and initial data. The RAM 103 is used as a work area of the CPU 101, and temporarily stores input information of the display device 100, the operation result in the image processing, and the like.

The imaging unit 104 is a camera that captures a real space. The display unit 105 is a liquid crystal display or the like, and displays an image capturing the real space, various graphics, and the like, on the display surface. The graphics are, for example, virtual objects (objects that do not exist in the real space, text, icons, and the like. The user can visually recognize the real space through the display surface of the display unit 105. In Embodiment 1, visual recognition of an image of a real space, which was captured and displayed on the display surface, is visual recognition of the real space through the display surface.

The sensing unit 106 is a sensor to detect a state of the user (e.g. a facial expression and a line-of-sight). The operation unit 107 includes various operation members (e.g. power supply button) and receives operation performed by the user. The communication unit 108 is a device conforming to such a communication standard as Ethernet and IEEE 802.11, and performs transmission/reception of data with an external device (e.g. an external sensor to measure perspiration amount of the user). This storage unit 109 stores various data. The storage unit 109 may be a hard disk or a memory card fixed to the display device 100, or a memory card, a flexible disk, and IC card, or the like that is detachable from the display device 100.

FIG. 2 is a block diagram depicting an example of a functional configuration of the display device 100. The functional units indicated in FIG. 2 are implemented, for example, by the CPU 101 executing programs. The display device 100 may include a dedicated processing circuit, to implement the functional units indicated in FIG. 2, separate from the CPU 101. All the functional units indicated in FIG. 2 may be implemented by the CPU 101, or all the functional units may be implemented by the dedicated processing circuit, or a part of the functional units may be implemented by the CPU 101 and the rest of the functional units may be implemented by the dedicated processing circuit. One dedicated processing circuit may implement one functional unit, or one dedicated processing circuit may implement a plurality of functional units, or a plurality of dedicated processing circuits may implement one functional unit.

A user information acquiring unit 201 acquires user information. For example, the user information acquiring unit 201 acquires at least a part of user information from the sensing unit 106, or acquires at least a part of user information from an external sensor via the communication unit 108. The user information is information on the state of the user, and includes information on vital signs (e.g. facial expression, heat rate, blood pressure and perspiration amount), for example.

An attention object detecting unit 202 detects an attention object, which is a real object (object existing in a real space) to which a line-of-sight of the user is directed. For example, the attention object detecting unit 202 acquires information on the line-of-sight of the user from the sensing unit 106, and acquires an image of the real space (data on the image (image data)) from the imaging unit 104. Then, based on the line-of-sight information, the attention object detecting unit 202 detects an attention object from the image of the real space. The image of the real space captured by the imaging unit 104 can be regarded as an image of a field-of-view of the user.

An image processing target determining unit 203 determines a real object to be an image processing target, based on user information acquired by the user information acquiring unit 201. For example, based on the vital signs of the user, the image processing target determining unit 203 determines whether the user experienced negative emotion, such as discomfort, fear and feeling upset. Then if it is determined that the user experienced negative emotion, the image processing target determining unit 203 determines the attention object, detected by the attention object detecting unit 202, as the image processing target.

An image processing determining unit 204 determines image processing to be performed on an image processing target based on the user information acquired by the user information acquiring unit 201. The image processing determined by the image processing determining unit 204 is image processing to reduce the conspicuity (saliency) of the image processing target, and is, for example, processing to superimpose a graphic, processing to erase a real object, processing to blur a real object, or processing to apply a mosaic on a real object. For example, the image processing determining unit 204 changes a type or an intensity of image processing based on user information. Saliency may be regarded as a degree of conspicuity or magnitude of the mental burden (psychological burden) applied to the user.

After determining an image processing target, the image processing target determining unit 203 records (registers) the information on the attention object in a user characteristic database (DB) 211 in the storage unit 109. After determining image processing, the image processing determining unit 204 records (registers) the information on this image processing in the user characteristic DB 211, so as to be associated with the attention object. If an attention object is determined to be the image processing target, the information on the image processing target and the information on the image processing are associated with each other, and recorded in the user characteristic DB 211 in this state. In the user characteristic DB 211, information on a real object (candidate of an attention object) and information on the image processing corresponding to this real object may be associated and recorded in this state.

An image processing unit 205 performs image processing determined by the image processing determining unit 204 on the image of the real space captured by the imaging unit 104, so as to reduce the saliency of the image processing target determined by the image processing target determining unit 203. The processing to superimpose a virtual object, however, is not performed by the image processing unit 205, but by a virtual object superimposing unit 206.

In a case where the image processing determining unit 204 determined the processing to superimpose a virtual object, the virtual object superimposing unit 206 performs the processing to superimpose the virtual object on the image of the real space captured by the imaging unit 104, so as to reduce the saliency of the image processing target. In the processing to superimpose the virtual object, the size and position of the virtual object are adjusted, so as to match with a region of the image processing target in the image of the real space, and then the virtual object is disposed (superimposed) on the image of the real space. In a virtual object DB 212 in the storage unit 109, a virtual object (data of virtual object image data)) has been recorded in advance, and the virtual object superimposing unit 206 reads and uses the virtual object from the virtual object DB 212. A virtual object is a virtualized object of a real object which may cause negative emotion to the user (e.g. a dog, spider, snake), so that the user does not experience the negative emotion. In the virtual object DB 212, virtual objects created by an external CG modeling tool or the like can be added when necessary.

In a case where an image processing target is determined by the image processing target determining unit 203 and image processing is determined by the image processing determining unit 204, the display unit 105 displays an image of the real space after performing this image processing on the display surface. In a case where an image processing target is not determined by the image processing target determining unit 203, the display unit 105 displays an image of the real space, on which image processing by the image processing unit 205 and the virtual object superimposing unit 206 has not been performed, on the display surface, for example.

FIG. 3 is a table indicating correspondence between a level of negative emotion (emotion level) based on the virtual signs of the user, and image processing determined by the image processing determining unit 204. The range of the intensity of the negative emotion (emotion intensity) is classified into a plurality of emotion levels using a plurality of thresholds, and the emotion level increases as the emotion intensity becomes higher. For example, the image processing determining unit 204 determines an emotion level of a user based on the vital signs of this user, and determines image processing in accordance with the determined emotion level, such that the negative emotion is suppressed at a stronger suppression degree as the determined emotion level becomes higher. When a user experiences a negative emotion, the user shows a reaction, such as feeling upset, in accordance with this emotion. The emotion level may be regarded as a reaction level. The correspondence between the emotion level and the image processing (e.g. number of steps of the emotion level, candidates of image processing) is not limited to those indicated in FIG. 3.

According to the correspondence indicated in FIG. 3, the processing to superimpose a virtual object is performed in a case of an emotion level 1. The processing to superimpose a virtual object is also performed in the case of an emotion level 2, but in the case of the emotion level 2, the processing to change the texture of the virtual object is performed as well, so that the negative emotion is further suppressed. For example, in the case of performing the processing to superimpose a virtual object of a living creature, the colors of the texture of the animal are changed to a single color, or the transmittance, reflectance or the like of the texture is changed in the processing to change the texture, so that the living creature of the virtual object becomes less real.

In the case of an emotion level 3, processing to blur the image processing target (real object determined as an attention object) is performed. In the case of an emotion level 4, processing to superimpose a warning dialog, which indicates that a real object disliked by the user is present, is performed. In the case of an emotion level 5, processing to erase the image processing target is performed. For this erasing processing, a technique called "diminished reality (DR)", for example, is used. In the case of the emotion level 5, processing to extract and superimpose an outline of the real object (image processing target) is also performed to notify the user of the presence of the real object (processing to superimpose the outline of the image processing target; processing to enhance the outline of the image processing target). In a case of an emotion level 6 as well, the processing to erase the image processing target is performed, but in the case of the emotion level 6, the processing to superimpose the outline of the image processing target is not performed.

Figure 4:
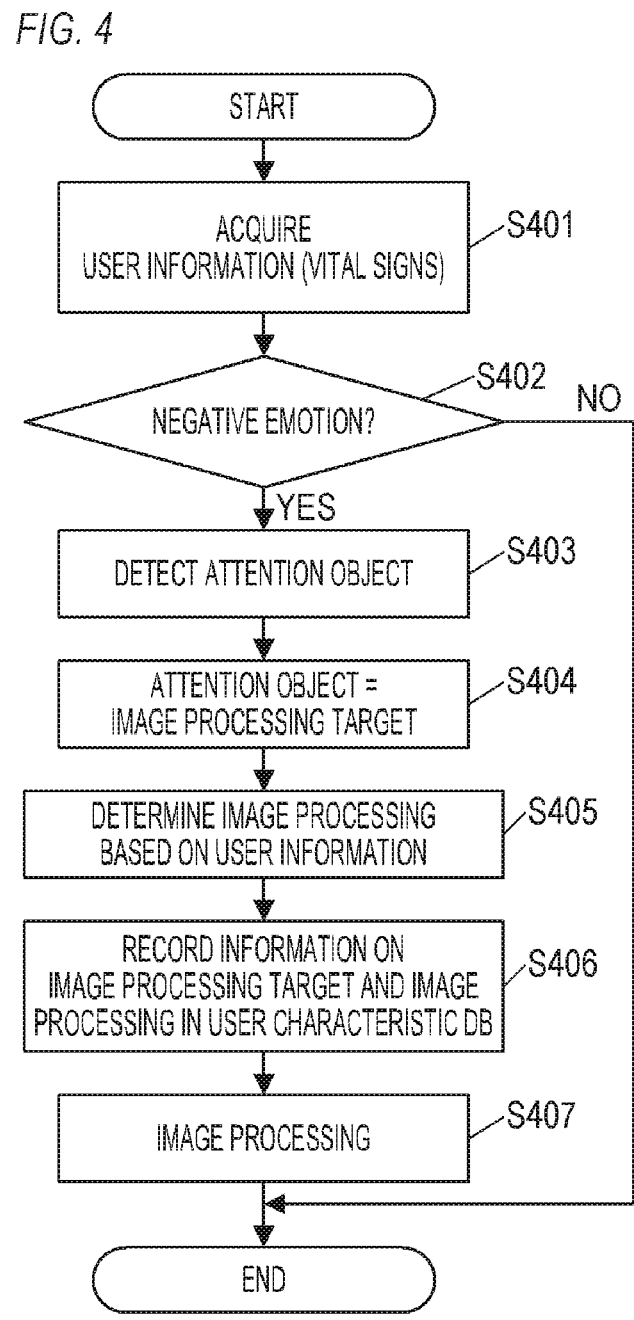
FIG. 4 is a flow chart depicting an example of an operation of the display device according to Embodiment 1.

FIG. 4 is a flow chart depicting an example of an operation of the display device 100. For example, the operation in FIG. 4 is implemented by the CPU 101 executing a program. The operation in FIG. 4 is started responding to the power of the display device 100 turning ON, for example, and is repeated at a predetermined cycle until the power of the display device 100 is turned OFF.

First in step S401, the user information acquiring unit 201 acquires information on vital signs (e.g. facial expression, heart rate, blood pressure and perspiration amount) as the user information.

Then in step S402, based on the user information (vital signs of the user) acquired in step S401, the image processing target determining unit 203 determines whether the user experienced negative emotion, such as discomfort and fear. For example, the image processing target determining unit 203 determines the intensity of the negative emotion (emotion intensity) based on the vital signs, and determines whether the determined emotion intensity is higher than a predetermined threshold. In the case where it is determined that the user experienced the negative emotion (in a case where it is determined that the emotion intensity is higher than the predetermined threshold), processing advances to step S403. In the case where it is determined that the user did not experience the negative emotion (in the case where it is determined that the emotion intensity is the predetermined threshold or less), this operation ends.

In step S403, the attention object detecting unit 202 detects an attention object, which is a real object to which a line-of-sight of the user is directed, from the image of the real space captured by the imaging unit 104. The attention object is detected by such a known technique as object recognition using deep learning, for example.

Then in step S404, the image processing target determining unit 203 determines that the user experienced a negative emotion by viewing the attention object detected in step S403, and determines this attention object as the image processing target.

In step S403, the attention object detecting unit 202 may detect an attention region, which is a region (range) to which the line-of-sight of the user is directed, instead of the attention object. Then in step S404, the image processing target determining unit 203 may detect a real object from the attention region, and determine the detected real object as the image processing target. The real object to be the image processing target is detected by such a known technique as object recognition using deep learning, for example.

Then in step S405, based on the user information acquired in step S401, the image processing determining unit 204 determines the image processing to be performed on the image processing target determined in step S404. For example, the information on the correspondence (correspondence between the emotion level and image processing) indicated in FIG. 3 has been recorded in the ROM 103 in advance. The image processing determining unit 204 determines the emotion level corresponding to the emotion intensity determined in step S402. Then in this correspondence recorded in the ROM 103, the image processing determining unit 204 determines the image processing corresponding to the determined emotion level as the image processing to be performed on the image processing target.

Then in step S406, the image processing target determining unit 203 records the information on the image processing target (attention object) determined in step S404 in the user characteristic DB 211 in the storage unit 109. For example, such a character string (label information) as "Dog", "Spider" and "Snake" is recorded in the user characteristic DB 211. The image processing determining unit 204 also records the information on the image processing determined in step S405 in the user characteristic DB 211, so as to be associated with the image processing target (attention object).

Then in step S407, at least one of the image processing unit 205 and the virtual object superimposing unit 206 performs the image processing determined in step S405 on the image of the real space captured by the imaging unit 104. The image processing is performed such that the saliency of the image processing target determined in step S404 is reduced. In this way, the image of the real space, after performing the image processing, is displayed on the display surface of the display unit 105. Here a concrete example in the case where the processing to superimpose the virtual object is determined will be described. The virtual object superimposing unit 206 retrieves a virtual object corresponding to the image processing target from the virtual object DB 212. If there is a virtual object corresponding to the image processing target, the virtual object superimposing unit 206 performs the processing to superimpose this virtual object. If there is no virtual object corresponding to the image processing target, the virtual object superimposing unit 206 performs the processing to superimpose a warning dialog.

As described above, according to Embodiment 1, in a case where an attention object is possibly a mental obstacle of the user based on the information on the state of the user, display on the display unit 105 is automatically controlled, so as to reduce the saliency of the attention object. Since operation by the user is not required, the user can quickly avoid visual recognition of the real object which becomes a mental obstacle.

In Embodiment 1, the visual recognition of the real space through the display surface is the visual recognition of an image of the real space captured and displayed on the display surface, but the present invention is not limited to this. For example, in a case where the display surface of the display unit 105 is transparent (e.g. lens portions of smart glasses), the user can visually recognize the actual real space (which is not imaged) through the display surface.

In Embodiment 1, the display device 100, to which the present invention is applied, has been described, but the present invention is applicable to various devices which can control display of a display device. For example, the present invention is applicable to a standalone personal computer (PC) and a game machine.

Embodiment 2

Embodiment 2 of the present invention will now be described. In the following, description on aspects (e.g. configuration, processing) the same as Embodiment 1 will be omitted, and aspect different from Embodiment 1 will be described. In Embodiment 1, whether or not the user experienced a negative emotion when viewing an attention object is determined based on the vital signs of the user. Then in the case where it is determined that the user experienced a negative emotion, display on the display unit 105 is controlled so as to reduce the salience of the attention object. According to the method of Embodiment 1, the user can quickly avoid visual recognition of a real object which becomes a mental obstacle. However, in the method of Embodiment 1, the user must experience the negative emotion once to reduce the saliency of the attention object by which the user experiences a negative emotion. Therefore in Embodiment 2, the display on the display unit 105 is controlled considering the characteristics of the user (operation of the display device 100 in the past), so as to minimize the user experiencing a negative emotion.

Figure 5:
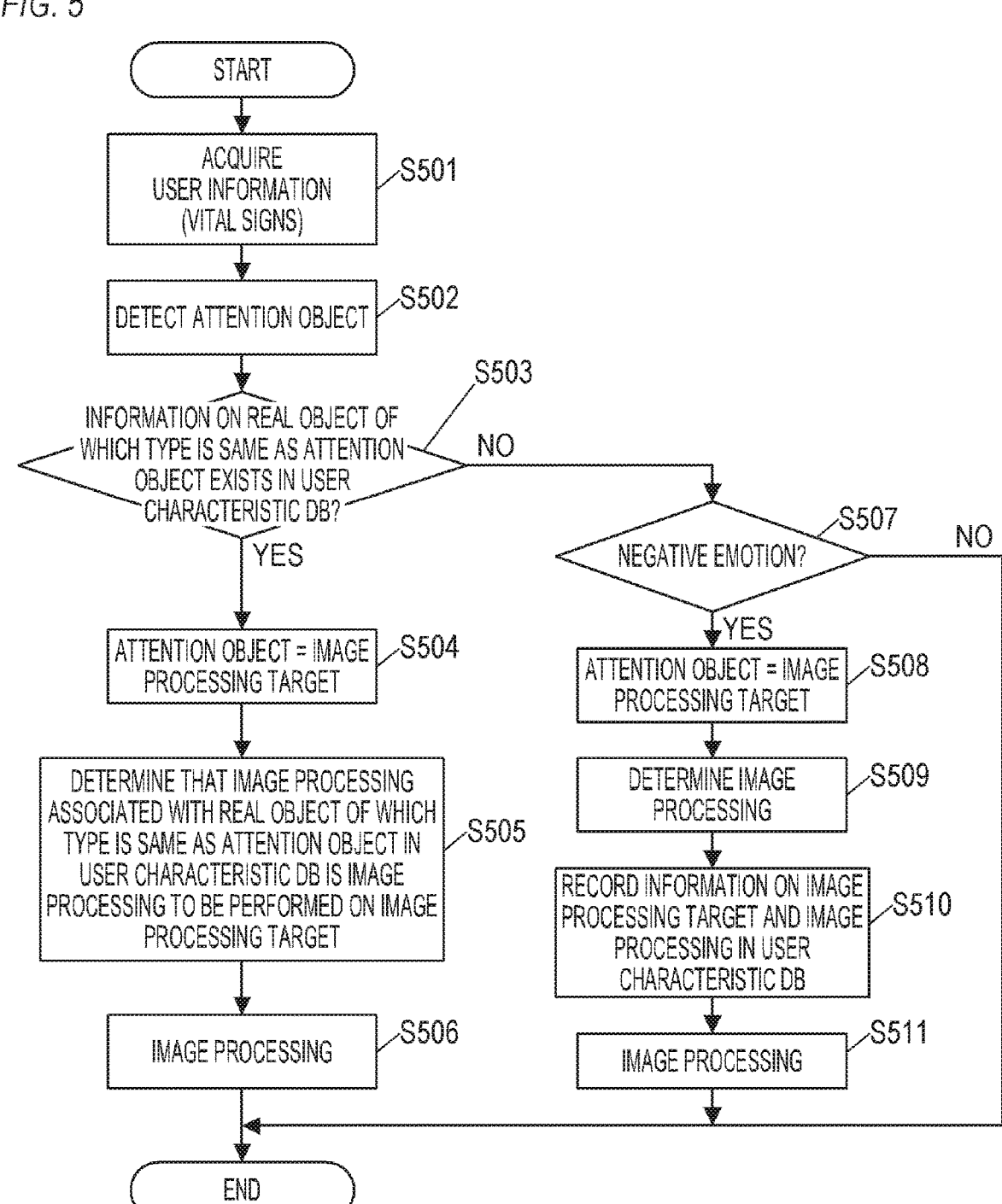
FIG. 5 is a flow chart depicting an example of an operation of a display device according to Embodiment 2.

FIG. 5 is a flow chart depicting an example of an operation of the display device 100. For example, the operation in FIG. 5 is implemented by the CPU 101 executing a program. The operation in FIG. 5 is started responding to the power of the display device 100 turning ON, for example, and is repeated at a predetermined cycle until the power of the display device 100 is turned OFF.

First in step S501, the user information acquiring unit 201 acquires information on vital signs as user information. This processing is the same as processing in step S401 in FIG. 4. Then in step S502, the attention object detecting unit 202 detects an attention object from an image of a real space. This processing is the same as the processing in step S403 in FIG. 4.

Then in step S503, the image processing target determining unit 203 determines whether or not information on a real object, of which type is the same as the attention object detected in step S502, is recorded in the user characteristic DB 211. A real object recorded in the user characteristic DB 211 is a mental obstacle, hence a real object, of which type is the same as this real object, is also likely to be a mental obstacle. Considering this aspect, processing advances to step S504 if it is determined that information on a real object, of which type is the same as the attention object detected in step S502, is recorded in the user characteristic DB 211. If it is determined that the information on a real object, of which type is the same as the attention object detected in step S502, is not recorded in the user characteristic DB 211, processing advances to step S507. The processing in steps S507 to S511 is the same as the processing in steps S402 and S404 to S407 in FIG. 4.

In step S504, the image processing target determining unit 203 determines that the user will experience a negative emotion when viewing the attention object detected in step S502, and determines this attention object as the image processing target. Then in step S505, the image processing determining unit 204 determines that the image processing, which is associated with a real object of which type is the same as the attention object in the user characteristic DB 211, as the image processing to be performed on the image processing target determined in step S504. The processing in steps S504 and S505 is not based on the user information acquired in step S501. Then in step S506, at least one of the image processing unit 205 and the virtual object superimposing unit 206 performs the image processing determined in step S505 on the image of the real space captured by the imaging unit 104. The image processing is performed such so as to reduce the saliency of the image processing target determined in step S504. In this way, the image of the real space, after performing the image processing, is displayed on the display surface of the display unit 105.

As described above, according to Embodiment 2, it is determined whether information on a real object (first object), of which type is the same as the attention object (second object), is recorded in the user characteristic DB 211. Then in the case where the information on the first object is recorded in the user characteristic DB 211, the display on the display unit 105 is controlled in the same manner as the case where the line-of-sight of the user is directed to the first object, that is, not based on the user information. Thereby in the case where a real object by which a negative emotion was experienced once and a real object of which type is the same as the real object registered in advance are about to be visually recognized, the user can avoid this visual recognition before experiencing the negative emotion.

Embodiment 3

Embodiment 3 of the present invention will now be described. In the following, description on aspects (e.g. configuration, processing) the same as Embodiment 1 will be omitted, and aspects different from Embodiment 1 will be described. In Embodiments 1 and 2, an example of using the information on the vital signs as the user information was described. Further, in Embodiments 1 and 2, an example of reducing the saliency of the attention object was described. In Embodiment 3, an example of using information on the time over which the line-of-sight of the user is directed to a real object (attention time) as the user information will be described. In the case where the attention time of the user directed to a real object is long, it can be regarded that the user wants to concentrate on the visual recognition of this real object. In such a case, other real objects could be mental obstacles to reduce the concentration of the user. Hence, in Embodiment 3, an example of reducing the saliencies of real objects, other than the attention object, will be described.

FIG. 6 is a table indicating an example of correspondence between a level of the attention time (attention level) of the user directed to a real object (attention object), and the image processing determined by the image processing determining unit 204. The range of the attention time is classified into a plurality of attention levels using a plurality of thresholds, where the attention level is higher as the attention time is longer. For example, the image processing determining unit 204 determines the attention level based on the attention time, and determines the image processing in accordance with the determined attention level, so that the attention object can be more easily concentrated on as the determined attention level is higher. The correspondence between the attention level and the image processing (e.g. a number of steps of the attention level, candidates of image processing) is not limited to those indicated in FIG. 6.

According to the correspondence indicated in FIG. 6, in the case of the attention level 1, the processing to blur the image processing target (all or part of the real objects other than the attention object) is performed. In the case of the attention level 2, the processing to superimpose a virtual object is performed. In the case of the attention level 3, the processing to erase the image processing target is performed.

FIG. 7 is a flow chart depicting an example of an operation of the display device 100. For example, the operation in FIG. 7 is implemented by the CPU 101 executing the program. The operation in FIG. 7 is started responding to the power of the display device 100 turning ON, for example, and is repeated at a predetermined cycle until the power of the display device 100 is turned OFF.

First in step S701, the attention object detecting unit 202 detects an attention object from an image of a real space. This processing is the same as the processing in step S403 in FIG. 4. Then in step S702, the user information acquiring unit 201 acquires information on the attention time of the user directed to the attention object detected in step S701, as the user information.

Then in step S703, the image processing target determining unit 203 determines whether or not the attention time exceeded a predetermined threshold based on the user information (attention time) acquired in step S702. Processing advances to step S704 if it is determined that the attention time exceeded the predetermined threshold, and this operation ends if it is determined that the attention time does not exceed the predetermined threshold.

Then in step S704, the image processing target determining unit 203 determines that the user wants to concentrate on the visual recognition of the attention object detected in step S701, and determines all the real objects, other than this attention object, as the image processing targets. A part of the real objects, other than this attention object, may be determined as the image processing targets.

Then in step S705, the image processing determining unit 204 determines image processing to be performed on the image processing target determined in step S704, based on the user information acquired in step S702. For example, the information on the correspondence (correspondence between attention level and image processing) as indicated in FIG. 6 has been recorded in the ROM 103 in advance. The image processing determining unit 204 determines the attention level corresponding to the attention time of the user. Then the image processing determining unit 204 determines the image processing corresponding to the determined attention level in the correspondence recorded in the ROM 103, as the image processing to be performed on the image processing target.

Then in step S706, at least one of the image processing unit 205 and the virtual object superimposing unit 206 performs the image processing determined in step S705, on the image of the real space captured by the imaging unit 104. This processing is the same as the processing in step S407 in FIG. 4.

As described above, according to Embodiment 3, if a real object, other than the attention object, is likely to be a mental obstacle of the user based on the information on the state of the user, the display on the display unit 105 is automatically controlled so as to reduce the saliency of this real object. Since user operation or the like become unnecessary thereby, the user can quickly avoid visual recognition of the real object which is their mental obstacle. Further, in the case where the user wants to concentrate on the visual recognition of an attention object, concentration of the user can be improved, and efficiency of the work which the user performs while looking at the attention object can be improved.

Embodiments 1 to 3 are merely examples, and configurations acquired by appropriately modifying or changing the configurations of the Embodiments 1 to 3 within a scope of the spirit of the present invention are also included in the invention. Further, configurations acquired by appropriately combining the configurations of Embodiments 1 to 3 are also included in the present invention. For example, in Embodiment 3, the display on the display unit 105 may be controlled considering the characteristics of the user (operation of the display device 100 in the past) just like Embodiment 2.

According to the present invention, the user can quickly avoid visual recognition of the real object which is a mental obstacle.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A head mounted display comprising:
an image sensor configured to capture an image of a real space;
a display configured to display the image of the real space captured by the image sensor so as to be visually recognized by a user; and
at least one memory and at least one processor which function as:
an acquiring unit configured to acquire user information on a state of the user; and
a control unit configured to control display on the display so as to reduce saliency of a first object, which is a real object to which a line-of-sight of the user is directed, or of a real object other than the first object, on a basis of the user information, wherein
in a case where a first control for the first object is performed on a basis of the user information, and then the user directed the line-of-sight to a second object which is a real object, of which type is the same as the first object, the control unit performs a second control for the second object not on a basis of the user information,
in a case where the first control is control to reduce saliency of the first object, the second control is control to reduce saliency of the second object, and
in a case where the first control is control to reduce saliency of a real object other than the first object, the second control is control to reduce saliency of a real object other than the second object.

2. The head mounted display according to claim 1, wherein the user information is information on vital signs of the user.

3. The head mounted display according to claim 2, wherein the vital signs include at least one of facial expression, heart rate, blood pressure and perspiration amount.

4. The head mounted display according to claim 2, wherein the control unit controls display on the display so as to reduce the saliency of the first object on a basis of the user information.

5. The head mounted display according to claim 1, wherein the user information includes information on time over which the line-of-sight of the user is directed to a real object.

6. The head mounted display according to claim 5, wherein the control unit controls display on the display so as to reduce the saliency of a real object other than the first object on a basis of the user information.

7. The head mounted display according to claim 1, wherein the control unit controls such that the image is displayed after performing image processing thereon on a basis of the user information.

8. The head mounted display according to claim 7, wherein the control unit differentiates a type of the image processing depending on the user information.

9. The head mounted display according to claim 7, wherein the image processing is processing to superimpose a graphic, processing to erase a real object, processing to blur a real object, or processing to apply a mosaic on a real object.

10. The head mounted display according to claim 9, wherein the processing to superimpose a graphic is processing to superimpose a virtual object or processing to superimpose a warning dialog.

11. The head mounted display according to claim 10, wherein the image processing includes the processing to superimpose the virtual object and processing to change texture of the virtual object.

12. The head mounted display according to claim 9, wherein the image processing includes the processing to erase the real object and processing to superimpose an outline of the real object.

13. The head mounted display according to claim 1, wherein the control unit performs the second control on a basis of first information on the first object and second information on the first control, the first information and the second information being information recorded in a predetermined database.

14. The head mounted display according to claim 1, wherein
the user information includes information on time over which the line-of-sight of the user is directed to a real object,
in a case where the time is a first time, the control unit controls such that the image is displayed after performing first image processing thereon, the first image processing being image processing to blur a real object other than the first object,
in a case where the time is a second time longer than the first time, the control unit controls such that the image is displayed after performing second image processing thereon, the second image processing being image processing to superimpose a virtual object on a real object other than the first object, and
in a case where the time is a third time longer than the second time, the control unit controls such that the image is displayed after performing third image processing thereon, the third image processing being image processing to erase a real object other than the first object.

15. The head mounted display according to claim 1, wherein
the control unit determines a negative emotion level in accordance with the user information,
in a case where the negative emotion level is a first level, the control unit controls such that the image is displayed after performing first image processing thereon, the first image processing being image processing to superimpose a virtual object on a processing target that is the first object, or a real object other than the first object, in a case where the negative emotion level is a second level higher than the first level, the control unit controls such that the image is displayed after performing the first image processing and the second image processing thereon, the second image processing being image processing to change texture of the virtual object, in a case where the negative emotion level is a third level higher than the second level, the control unit controls such that the image is displayed after performing third image processing thereon, the third image processing being image processing to blur the processing target, in a case where the negative emotion level is a fourth level higher than the third level, the control unit controls such that the image is displayed after performing fourth image processing thereon, the fourth image processing being image processing to superimpose a warning dialog, in a case where the negative emotion level is a fifth level higher than the fourth level, the control unit controls such that the image is displayed after performing fifth image processing and sixth image processing thereon, the fifth image processing being image processing to erase the processing target and sixth image processing being image processing to superimpose an outline of the processing target, and in a case where the negative emotion level is a sixth level higher than the fifth level, the control unit controls such that the image is displayed after performing the fifth image processing thereon without the sixth image processing.

16. The head mounted display according to claim 1, wherein the control unit controls such that the image is displayed after performing image processing thereon on a basis of the user information, in a case where processing to superimpose a virtual object is performed as the image processing, the control unit retrieves a virtual object corresponding to a processing target that is the first object, or a real object other than the first object from a predetermined database, if there is the virtual object corresponding to the processing target, the control unit performs processing to superimpose the virtual object corresponding to the processing target as the image processing, and if there is no virtual object corresponding to the processing target, the control unit performs processing to superimpose a warning dialog.

17. A control method of a head mounted display capable of visually recognizing a real space through a display surface, the control method comprising:

acquiring user information on a state of a user; and controlling display on the head mounted display so as to reduce saliency of a real object to which a line-of-sight of the user is directed, or of a real object other than the real object to which the line-of-sight of the user is directed, on a basis of the user information, wherein in a case where a first control for the first object is performed on a basis of the user information, and then the user directed the line-of-sight to a second object which is a real object, of which type is the same as the first object, a second control for the second object is performed not on a basis of the user information, in a case where the first control is control to reduce saliency of the first object, the second control is control to reduce saliency of the second object, and in a case where the first control is control to reduce saliency of a real object other than the first object, the second control is control to reduce saliency of a real object other than the second object.

18. A non-transitory computer readable medium that stores a program, wherein the program causes a computer to execute a control method of a head mounted display capable of visually recognizing a real space through a display surface, the control method comprising:

acquiring user information on a state of a user; and controlling display on the head mounted display so as to reduce saliency of a real object to which a line-of-sight of the user is directed, or of a real object other than the real object to which the line-of-sight of the user is directed, on a basis of the user information, wherein in a case where a first control for the first object is performed on a basis of the user information, and then the user directed the line-of-sight to a second object which is a real object, of which type is the same as the first object, a second control for the second object is performed not on a basis of the user information, in a case where the first control is control to reduce saliency of the first object, the second control is control to reduce saliency of the second object, and in a case where the first control is control to reduce saliency of a real object other than the first object, the second control is control to reduce saliency of a real object other than the second object.

* * * * *